(12) United States Patent
Hong et al.

(10) Patent No.: US 11,470,484 B2
(45) Date of Patent: Oct. 11, 2022

(54) UAV ARRANGEMENT DEVICE AND METHOD BASED ON MACHINE LEARNING FOR MAXIMIZING COMMUNICATION THROUGHPUT

(71) Applicant: UNIVERSITY-INDUSTRY COOPERATION GROUP OF KYUNG HEE UNIVERSITY, Gyeonggi-do (KR)

(72) Inventors: Choong Seon Hong, Gyeonggi-do (KR); Yu Min Park, Gyeonggi-do (KR)

(73) Assignee: University-Industry Cooperation Group of Kyung Hee University, Gyeonggi-Do (KR)

( * ) Notice: Subject to any disclaimer, the term of this patent is extended or adjusted under 35 U.S.C. 154(b) by 76 days.

(21) Appl. No.: 17/003,454

(22) Filed: Aug. 26, 2020

(65) Prior Publication Data
US 2021/0168622 A1 Jun. 3, 2021

(30) Foreign Application Priority Data

Nov. 28, 2019 (KR) .................. 10-2019-0155363
Aug. 24, 2020 (KR) .................. 10-2020-0106067

(51) Int. Cl.
| | | |
|---|---|---|
| H04W 16/18 | (2009.01) | |
| G08G 5/00 | (2006.01) | |
| H04B 7/185 | (2006.01) | |

(52) U.S. Cl.
CPC .......... *H04W 16/18* (2013.01); *G08G 5/0069* (2013.01); *H04B 7/18504* (2013.01)

(58) Field of Classification Search
CPC .......................... H04W 84/06; H04W 84/042
See application file for complete search history.

(56) References Cited

U.S. PATENT DOCUMENTS 10,531,240 B1 * 1/2020 Sciancalepore ........ H04B 17/27

OTHER PUBLICATIONS

Galkin, et al. (2016) Wireless Days pp. 1-6, "Deployment of UAV-Mounted Access Points According to Spatial User Locations in Two-Tier Cellular Networks".

(Continued)

*Primary Examiner* — Kevin Kim
(74) *Attorney, Agent, or Firm* — Adsero IP

(57) ABSTRACT

The invention relates to a UAV arrangement device based on machine learning for maximizing communication throughput, the UAV arrangement device including: a communication module unit that receives location information and communication demand information of a user and transmits UAV arrangement information; a user information unit that stores and analyzes the location information and the communication demand information of the user; a UAV information unit that stores basic UAV information including UAV communication throughput; and a clustering algorithm modeling unit that calculates a location at which communication throughput is maximized, with a clustering algorithm based on the location information and the communication demand information of the user.

The invention relates to a UAV arrangement method based on machine learning for maximizing communication throughput, the UAV arrangement method including: checking location information of a user; checking communication demand of a user; calculating central nodes of respective clusters at which communication throughput is maximized, by using a clustering algorithm; and arranging unmanned aerial vehicles of central nodes of the respective clusters.

12 Claims, 8 Drawing Sheets

(56) References Cited

OTHER PUBLICATIONS

Office Action dated May 17, 2021 from Korean Application No. 10-2020-0106067 (with English Translation).

* cited by examiner

FIG. 3

Part 1: Weighted K-means Clustering based on User Demand
Input: $u_i, d_j, k_j, \forall i \in U, \forall j \in D$
Output: $M_j, k_j, \forall j \in D$
do
  $M_j^p \leftarrow M_j$ for each $j \in D$
  for $i \in U$
    Choose $j \in D$ s.t. minDistance(i,j)
    Add i to $M_j$
  for $j \in D$
    $k_j \leftarrow (\sum_{i \in M_j} u_i * \alpha * d_i)/(\sum_{i \in M_j} d_i)$
while $M_j \neq M_j^p$ for each $j \in D$

FIG. 4

```
Part 2: Cooperation Algorithm in the overload
Input: $M_j, u_i, d_i, k_j, \forall i \in U, \forall j \in D$
Output: $M'_j, k_j, \forall j \in D$
for j ∈ D
  if $C_j$'s number > 10
    for k ∈ D (k ≠ j)
      if $M_j$'s number < 10
        Choose i ∈ $M_j$ s. t. minDistance(i, k)
        Delete i to $M_j$ And Add i to $M_k$
        break
      continue
$M'_j$ ← $M_j$ for each j ∈ D
```

UAV ARRANGEMENT DEVICE AND METHOD BASED ON MACHINE LEARNING FOR MAXIMIZING COMMUNICATION THROUGHPUT

BACKGROUND OF THE INVENTION

Field of the Invention

The present invention relates to UAV arrangement based on machine learning for maximizing communication throughput, and more specifically, to optimal UAV arrangement depending on a change in communication demand of a user based on Q-learning.

Description of the Related Art 5G which is the next generation mobile communication is a wireless network technology using a millimeter wave. Currently, commercialization of 5G is in progress; however, more stable commercialization demands installation of more base stations. However, additional installation of new base stations results in economic inefficiency and brings about shortcomings in that the additional installation does not provide a flexible measure for a change in communication environment. Hence, a method for using an unmanned aerial vehicle instead of the additional installation of a ground base station is actively studied.

The unmanned aerial vehicle or a drone means an aircraft which is not directly boarded by a pilot. The unmanned aerial vehicle was first developed for military use, but the unmanned aerial vehicle has been used currently in various fields including the private and public sectors. In addition, the unmanned aerial vehicle has great potential in the communication field due to low costs and free movement and is appreciated as a substitute which can fulfill a function of the ground base station in the future. However, limited battery capacity, a limited communication range, and the like are limits for the unmanned aerial vehicle in performing the function of the base-station. Further, when a rapid change in communication demand of a user occurs, flexible managing ability of the unmanned aerial vehicle against the change remains as a problem.

SUMMARY OF THE INVENTION

The invention is made to solve the problem described above, and an object thereof is to provide a device and method for arranging clustering unmanned aerial vehicles to maximize communication throughput in response to communication demands of a plurality of users.

Another object of the invention is to provide a device and method for re-arranging unmanned aerial vehicles to maximize communication throughput, when unmanned aerial vehicles are arranged, and then communication overload occurs.

Still another object of the invention is to provide a device and method for arranging unmanned aerial vehicles to maximize communication throughput in response to a change in communication demands of a plurality of users with a Q-learning algorithm.

The invention relates to a UAV arrangement device based on machine learning for maximizing communication throughput, the UAV arrangement device including: a communication module unit that receives location information and communication demand information of a user and transmits UAV arrangement information; a user information unit that stores and analyzes the location information and the communication demand information of the user; a UAV information unit that stores basic UAV information including UAV communication throughput; and a clustering algorithm modeling unit that calculates a location at which communication throughput is maximized, with a clustering algorithm based on the location information and the communication demand information of the user.

The invention relates to a UAV arrangement method based on machine learning for maximizing communication throughput, the UAV arrangement method including: checking location information of a user; checking communication demand of a user; calculating central nodes of respective clusters at which communication throughput is maximized, by using a clustering algorithm; and arranging unmanned aerial vehicles of central nodes of the respective clusters.

According to examples of the invention, it is possible to provide a communication network service that can take action with respect to inconsistent communication demand of users by using an unmanned aerial vehicle.

According to the examples of the invention, when communication demand of the users rapidly increases momentarily, it is possible to rapidly take action with respect to a communication overload environment by re-arranging unmanned aerial vehicles.

According to the examples of the invention, it is possible to arrange the unmanned aerial vehicles at optimal locations for maximizing communication throughput, without initial learning data through a Q-learning algorithm.

According to the examples of the invention, it is possible to provide a new communication network environment which achieves ground base station installation-cost saving effect and can rapidly take action with respect to a changing environment.

BRIEF DESCRIPTION OF THE DRAWINGS

FIG. 3 is a view for illustrating a modified K-means algorithm according to the example of the invention;

FIG. 4 is a view for illustrating an avoidance algorithm according to the example of the invention;

DETAILED DESCRIPTION OF THE PREFERRED EMBODIMENTS

Figure 1:
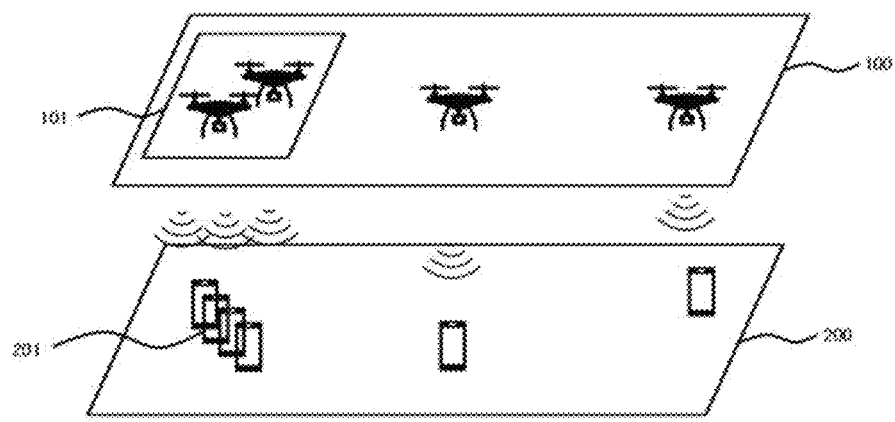
FIG. 1 is a view illustrating clustering-UAV arrangement for maximizing communication throughput according to an example of the invention.

The objects, features, and advantages described above will be described below in detail with reference to the accompanying drawings, and thus those who have ordinary knowledge in the technical field to which the invention belongs can easily embody technical ideas of the invention. In the description of the invention, when detailed description of a known technology related to the invention is deemed to result in obscuring the gist of the invention unnecessarily, the detailed description thereof will be omitted.

The same reference signs are used to represent the same or similar configurational elements in the drawings, and every combination described in this specification and claims can be combined in any manner. Besides, unless otherwise defined, the description has to be understood as follows. A mention of a singular item may include one or more items, and a mention of a singular form may also include a plural form.

Terms used in this specification have an object to describe only specific examples and are not intentionally used to limit the invention. Singular nouns as used in this specification can be also intended to have a meaning of plural nouns thereof, unless otherwise described clearly in a corresponding sentence. Terms such as "and/or" mean to include all combinations of items listed as related and any one item. Terms such as "include", "to include", "including", "comprising", "have", or "having", has connotative meanings, and thus the terms specify a described feature, integer, step, operation, element, and/or component and do not exclude presence or addition of one or more other features, integers, steps, operations, elements, components, and/or a group thereof. Steps, processes, operations of a method described in this specification do not have to be understood to be necessarily executed in the specific order described or illustrated here, unless execution order thereof is specifically and absolutely fixed. The following has to be also understood. Additional or alternative steps can be used.

In addition, configurational elements can be realized with respective hardware processors, the configurational elements can be integrated to be realized with one hardware processor, or the configurational elements can be combined with each other to be realized with a plurality of hardware processors.

Hereinafter, preferred examples according to the invention will be described in detail with reference to the accompanying drawings.

FIG. 1 is a view illustrating clustering-UAV arrangement for maximizing communication throughput according to an example of the invention.

An unmanned aerial vehicle of the invention is a device that can fly autonomously. For example, the unmanned aerial vehicle can be called as an unmanned aircraft, a drone, or the like. In the invention, the terms are unified as the 'unmanned aerial vehicle', and the description thereof is provided. The unmanned aerial vehicle can play a role of a communication node or a relay node on a wireless communication network. The wireless communication network means a network that performs communication wirelessly. The wireless communication network is present as various networks depending on communication methods used. For example, there are various technologies such as a mobile communication network such as 3G/LTE, a wireless communication network in accordance with IEEE 802.11, or a network using the latest 5G technology. The unmanned aerial vehicle of the invention can have a communication module that can fulfill a communication function.

With reference to FIG. 1, an arranged shape of clustering unmanned aerial vehicles 100 can be observed. The unmanned aerial vehicle can fulfill a communication function of a ground base station. The unmanned aerial vehicle can check communication demand of a user and, thereby, can provide a communication service to the user by using the communication module of the unmanned aerial vehicle. The communication demand of a user can be different depending on communication use of a user. Hence, the clustering unmanned aerial vehicles 100 can be arranged depending on users 200 having different communication demand. The clustering unmanned aerial vehicles 100 can be arranged to maximize communication demand of users.

According to the example of the invention, a phenomenon in which users crowd any physical region 201 and communication traffic crowds the region can occur. Consequently, arrangement of the clustering unmanned aerial vehicles 101 can be changed to process the communication demand such that communication throughput of the region 201 crowded with communication traffic can be processed. Since one unmanned aerial vehicle of the invention has constant communication coverage and communication throughput, the communication demand can be processed by increasing the number of unmanned aerial vehicles arranged in the corresponding region or arranging additional unmanned aerial vehicles therein, when communication traffic crowds the region.

Hereinafter, the UAV optimal-arrangement device that maximizes communication throughput will be specifically described with reference to FIG. 2.

Figure 2:
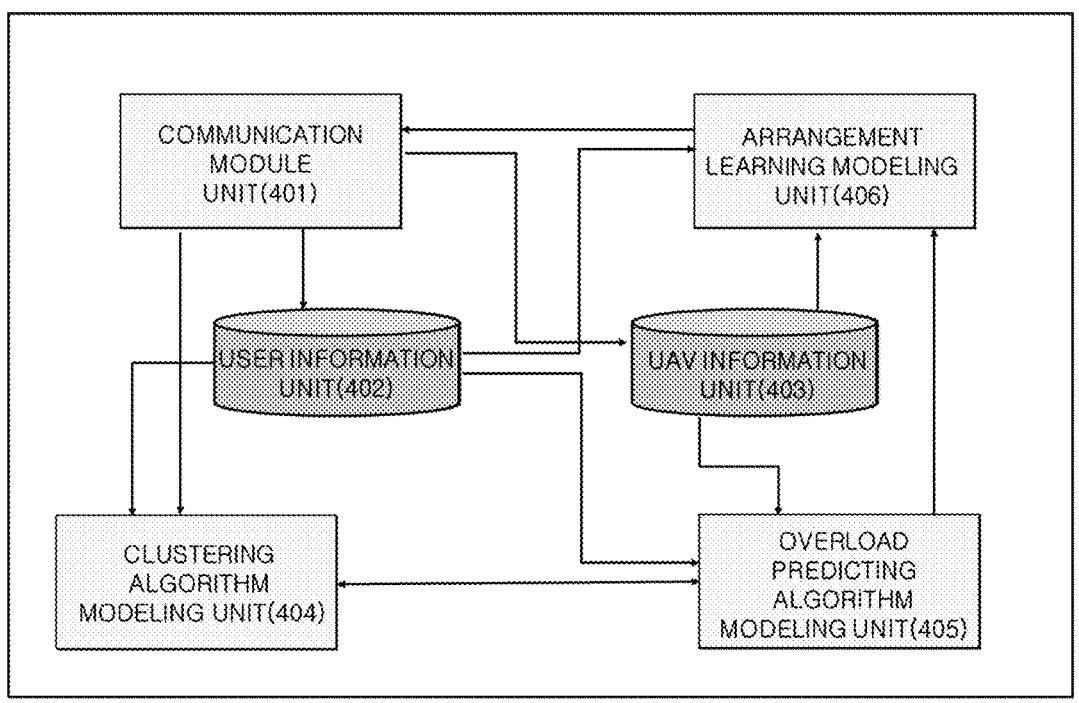
FIG. 2 is a block diagram of a clustering-UAV arrangement device that maximizes communication throughput according to the example of the invention.

FIG. 2 is a block diagram of the clustering-UAV arrangement device that maximizes communication throughput according to the example of the invention.

In the invention, the communication throughput means communication service throughput provided to a user by arranging the clustering unmanned aerial vehicles to provide the communication service. More specifically, the description of the communication throughput and a meaning of maximization of the communication throughput is provided using an air-to-ground path loss model and a max-min airtime fairness model.

The air-to-ground path loss model is a model for calculating a signal-to-noise ratio (SNR) due to a signal attenuation effect depending on a distance d in a communication process between the unmanned aerial vehicle and a user from Expression (1).

Expression (1)

$$PL \text{ (dB)} = 20\log_{10}\left(\frac{4\pi df}{c}\right) + P(LoS)\eta_{LoS} + P(NLoS)\eta_{NLoS}$$

$$P_r(d) = P_t + G_t - PL + G_r - L$$

$$SNR = \frac{\text{singnal power}}{\text{noise power}} = \frac{P_r(d)}{N}$$

In Expression (1), P(Los) represents a probability of line-of-sight without an obstacle through communication, and P(NLos) represents a probability of having an obstacle through communication. Hence, P(Los)+P(NLos)=1, and $\eta_{LoS}$ corresponds to an additional attenuation value. $C_i$ representing data throughput of a user i can be obtained by substituting SNR representing a signal-to-noise ratio in Expression (2).

$$C_i = B\log_2(1+SNR) \qquad \text{Expression (2)}$$

The max-min airtime fairness model is a model for fairly distributing a channel using time $t_j$, that is, airtime, depending on different communication demands of the users. With reference to Expression (3), a sum of channel using times for different communication demands can be smaller than 1, and thus a bandwidth which can be provided by the unmanned aerial vehicles can be divided depending on the communication demands.

$$\sum_{j \in V} t_j \leq 1 \qquad \text{Expression (3)}$$

$$C_{T,j} = t_j C_j \text{ for } \forall\, j \in S$$

In Expression (3), $C_{T,j}$ means communication throughput of a user j. Hence, obtaining of clustering-UAV arrangement location at which the communication throughput for all users is maximized like Expression (4) is an object of the invention.

$$\max \sum_{j \in S} C_{T,j} \qquad \text{Expression (4)}$$

A clustering-UAV arrangement device 400 that maximizes the communication throughput of the invention can include a communication module unit 401, a user information unit 402, a UAV information unit 403, a clustering algorithm modeling unit 404, an overload predicting algorithm modeling unit 405, and an arrangement learning modeling unit 406. Hereinafter, specific functions of the configurational elements will be described.

The communication module unit 401 can receive information about communication demand of a user and communication throughput related to the communication network service performed by the unmanned aerial vehicles. The communication module unit 401 can transmit, to the clustering unmanned aerial vehicles, information related to clustering-UAV arrangement for maximizing the communication throughput. The clustering unmanned aerial vehicles can be arranged at optimal locations in accordance with transmitted arrangement information.

The user information unit 402 can store and analyze information about the communication demand of a user which is received through the communication module unit 401. The user information unit 402 can store and analyze the location information of the users. For example, the location information of the users can contain location information based on GPS. The user information unit 402 can periodically store the communication demand of a user and can analyze a cycle of change and a change trend of the communication demand of the user.

For example, the user information unit 402 can check an average change in communication demand of the user during any period and can define the user having a larger change than the average change as a user who needs intensive analysis.

The user information unit 402 can collect and analyze information about a region which is momentarily crowded with communication traffic. For example, the user information unit 402 can check an average of a change in communication traffic in any region unit during any period and can define the region having a larger change than the average change as a region which needs intensive analysis.

The UAV information unit 403 can receives basic information of an unmanned aerial vehicle. The basic information of the unmanned aerial vehicle can contain a navigable distance, time, battery information, a UAV model, date of manufacture, or the like of the unmanned aerial vehicle. In addition, the basic information can contain information of maximum communication throughput that can be provided by one unmanned aerial vehicle, communication service providable coverage of one unmanned aerial vehicle, or the like.

In addition, the basic information can contain information of an available unmanned aerial vehicle when the unmanned aerial vehicles are arranged in a communication possible region based on the communication demand of the users of the user information unit 402. The UAV information unit 403 can receive every information that can be provided to the unmanned aerial vehicle, and the information does not have to be construed as limited information.

The clustering algorithm modeling unit 404 fulfills a function of determining optimal arrangement of the clustering unmanned aerial vehicles, for maximizing communication throughput. The clustering algorithm modeling unit 404 can use a clustering algorithm for grouping unlabeled data, as a representative technology of unsupervised learning. Examples of the clustering algorithm include a mean shift algorithm, a Gaussian mixture model (GMM) using a Gaussian distribution model, density based spatial clustering of applications with noise (DBSCAN), or the like.

In the invention, a modified K-means clustering algorithm to which the communication demand of the users is reflected as an additional parameter, based on a K-means clustering algorithm, is used.

A function of cost used by the K-means clustering algorithm is used to divide data into several groups and to check central nodes of the respective groups, and a sum of squared distances between the central nodes of the respective groups and data that belongs to the respective groups is set as a function. The function of cost can be expressed as Expression (5) below.

$$\mathrm{argmin}_S \sum_{i=1}^{k} \sum_{x \in S_i} \|x - \mu_i\|^2 \qquad \text{Expression (5)}$$

The K-means algorithm corresponds to an algorithm employed to group the data in order to minimize the function of cost and to find the central nodes of the respective groups. When the sum of squared distances between the central nodes of the groups and items of the data with a K-means algorithm in the related art, a model to which weight values between items of data are reflected. However, the clustering algorithm modeling unit 404 of the invention uses a K-means algorithm model developed and modified from the K-means algorithm.

The modified K-means algorithm used by the clustering algorithm modeling unit 404 of the invention is an algorithm to which the communication demand of the users is reflected as an additional parameter. The modified K-means algorithm is specifically described with reference to FIG. 3.

FIG. 3 is a view for illustrating the modified K-means algorithm according to the example of the invention.

With reference to FIG. 3, the modified K-means algorithm, to which the communication demand of the users of the invention is reflected, can be checked. The communication demand of the users can be inconsistent in an actual communication environment and can have a different value for each user. Hence, when the central nodes are calculated with the K-means algorithm, a method for calculating the central nodes of the respective clusters by reflecting the different communication demands needs to be used. In the invention, Expression (6) can be used to reflect the communication demand of different users.

$$D = \sum_{i \in M_j} d_i$$

Expression (6)

$$(x_j^*, z_j^*) = \frac{\sum_{i \in M_j} (x_i, z_i) * \alpha * d_i}{D}$$

In Expression (6), $d_i$ represents the communication demand of a user i. $(x^*_j, z^*_j)$ represents a distance between each central node of each cluster and each item of data. Hence, a modified distance value $(x^*_j, z^*_j)$ can be calculated by multiplying the distance between each central node of each cluster and each item of data and a constant α and the user communication demand $d_i$. Hence, when central nodes of the clusters, by which the smallest sum of values of distances between the central nodes of the respective clusters and the items of data is obtained, are calculated, it is possible to calculate the central node of the respective clusters by applying a constant weight value to the items of data. In the invention, the constant weight value can become the communication demand of different users.

With reference to FIG. 3, input data and output data of the modified K-means algorithm can be checked. $u_i$, $d_i$, $k_i$, ∀i∈U, ∀j∈D as items of the input data correspond to a location of the user i, communication demand of the user i, a location of an unmanned aerial vehicle j, respectively. $M_j$, $k_j$, ∀j∈D as items of the output data correspond to a user group to which the unmanned aerial vehicle j belongs and a location for maximizing the communication throughput of the unmanned aerial vehicle j, respectively. With reference to FIG. 3, $M_j^p$ corresponds to a temporary user group to which any unmanned aerial vehicle j belongs. The modified K-means algorithm outputs when $M_j$, when $M_j^p$ satisfies an optimal condition while $M_j^p$ is changed.

The optimal condition is obtained when a modified distance value is obtained based on the locations and communication demand of all of the users in a cluster to which any unmanned aerial vehicle j is allocated as described above in Expression (2), and the smallest sum of the modified distance values of all of the unmanned aerial vehicles is obtained. Here, locations of the central node of the respective clusters for obtaining modified distance values of the respective clusters are set as optimal arrangement locations of the unmanned aerial vehicles for maximizing the communication throughput, and the locations have optical location values for maximizing processing of the different communication demands of the users.

The clustering algorithm modeling unit 404 can calculate a location value by which maximum communication throughput is achieved, by using the modified K-means algorithm. The clustering algorithm modeling unit 404 can transmit location values of the respective unmanned aerial vehicles to the communication module unit 401, and the communication module unit 401 can transmit communication information for UAV arrangement.

Here, the location values calculated by the clustering algorithm modeling unit in an actual communication environment are obtained without reflecting a communication processing limit of the unmanned aerial vehicle. Specifically, the location values are obtained in a state where the communication throughput of one unmanned aerial vehicle is assumed to be infinite. However, one unmanned aerial vehicle has the communication processing limit in reality, and one unmanned aerial vehicle can be overloaded with communication, when the communication demand exceeds the communication processing limit. Hence, a method for preventing the communication overload is described.

Back to FIG. 2, the clustering-UAV arrangement device 400 can further include the overload predicting algorithm modeling unit 405. The overload predicting algorithm modeling unit 405 fulfills a function of re-arranging the unmanned aerial vehicles such that any unmanned aerial vehicle is not overloaded with communication as described above.

According to the example of the invention, the overload predicting algorithm modeling unit 405 can extract a re-arrangement result value of the unmanned aerial vehicles by using an avoidance algorithm such that any unmanned aerial vehicle is not overloaded with communication, based on the location values of the unmanned aerial vehicles which are extracted from the clustering algorithm modeling unit. The detailed description of the avoidance algorithm is provided with reference to FIG. 4.

FIG. 4 is a view for illustrating the avoidance algorithm according to the example of the invention.

With reference to FIG. 4, after the unmanned aerial vehicles are arranged in accordance with the location values extracted from the clustering algorithm modeling unit, a communication overload situation can occur. The communication overload situation means a state in which communication throughput $C_j$ of any unmanned aerial vehicle j is lower than the communication demand of the users in a cluster to which the unmanned aerial vehicle j belongs. The avoidance algorithm of the invention enables to check an unmanned aerial vehicle k closest to any user i for the user i in a cluster to which any unmanned aerial vehicle j which is overloaded with communication.

Next, the avoidance algorithm enables the user i to be included in a cluster to which the unmanned aerial vehicle k belongs. Next, the avoidance algorithm can be repeated, until the unmanned aerial vehicle j overloaded with communication can process the communication demand completely. When any unmanned aerial vehicle j can process the communication demand, a cluster of the unmanned aerial vehicle is set, and it is possible to calculate, in the cluster, the central nodes of the respective clusters, by which a sum of distance values modified using the modified K-means algorithm of the clustering algorithm modeling unit. The calculated central nodes of the respective clusters can be locations at which the unmanned aerial vehicles are re-arranged.

$M^*_j k_j$ in FIG. 4 represents an output value of the avoidance algorithm and is related to a cluster and optimal arrangement of the unmanned aerial vehicles by which the communication throughput is maximized, when the communication demand of any unmanned aerial vehicle j can be processed. The output value becomes a result value obtained by reflecting the communication processing limit of the unmanned aerial vehicle.

Hence, the UAV arrangement device of the invention is a model to which the communication overload situation of the unmanned aerial vehicles is reflected with respect to the UAV arrangement for maximizing the communication throughput. Here, the location and the communication demand of the user have values which are not fixed values but continuously changing values in the actual communication environment. Hence, the clustering-UAV arrangement method for taking better action than in the actual communication environment is described.

Back to FIG. 2, the clustering-UAV arrangement device 400 can further include the arrangement learning modeling unit 406. A Q-learning algorithm of the arrangement learning modeling unit 406 is provided to modify parameters such that more rewards are received while the actions set in a given environment are repeated. Hence, the Q-learning algorithm has three areas of a given environment, action, and a reward for the action.

There are various Q-learning algorithms, and the Q-learning algorithm can be classified into a value-based Q-learning algorithm and a policy-based Q-learning algorithm. The most representative Q-learning algorithms of the policy-based Q-learning algorithms are trust region policy optimization (TRPO) and proximal policy optimization (PPO). The arrangement learning modeling unit 406 of the invention can use the PPO.

In the arrangement learning modeling unit 406 of the invention, the environment of the Q-learning algorithm means presence of a plurality of users having different communication demands, the action means movement of the unmanned aerial vehicles, and the reward for the action means an increase in communication throughput after the movement. The arrangement learning modeling unit 406 provides learning such that the communication throughput after the movement increases more than the communication throughput before the movement. In this manner, the UAV arrangement can be managed to increase the communication throughput with the Q-learning algorithm without additional UAV arrangement managing personnel.

Figure 5:
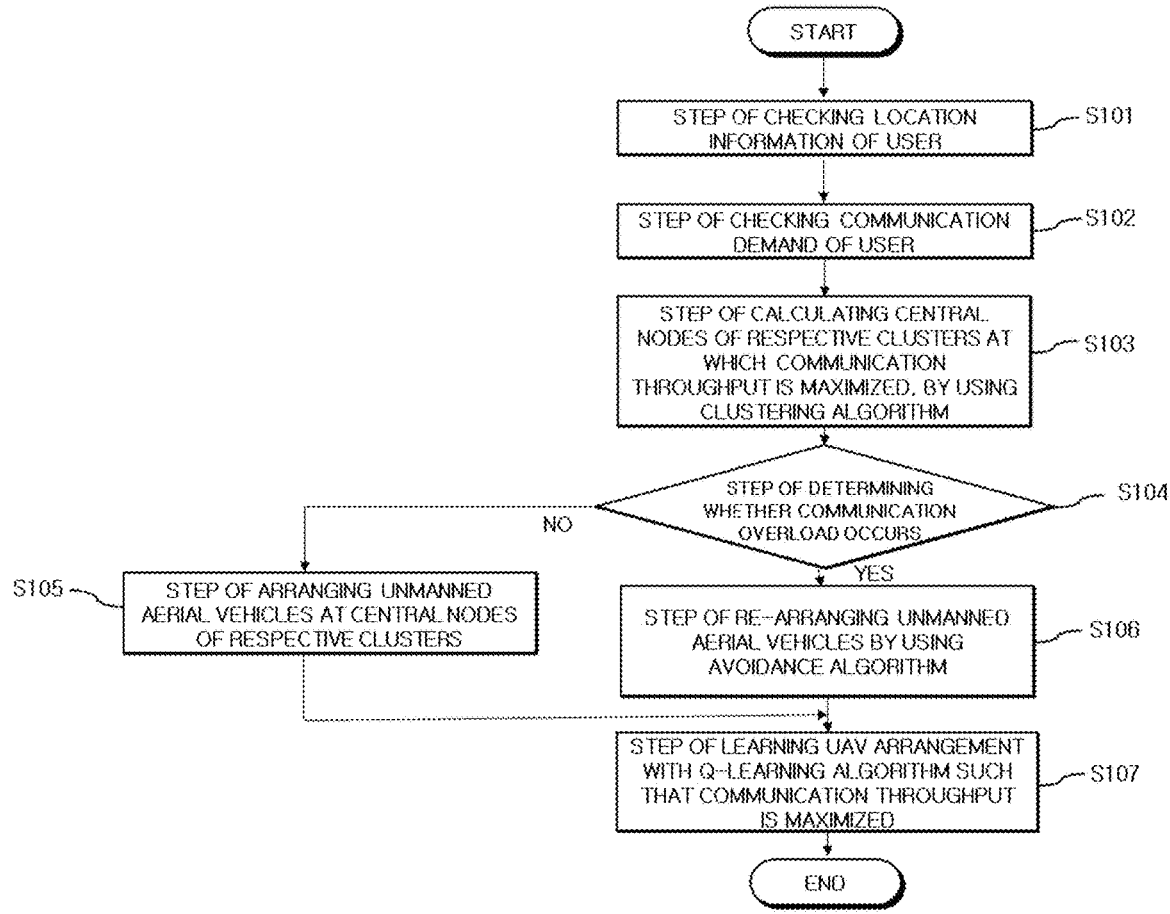
FIG. 5 is a flowchart of a clustering-UAV arrangement method for maximizing communication throughput according to another example of the invention.

FIG. 5 is a flowchart of the clustering-UAV arrangement method for maximizing the communication throughput according to another example of the invention.

With reference to FIG. 5, the clustering-UAV arrangement method for maximizing the communication throughput can include Step S101 of checking location information of a user, Step S102 of checking the communication demand of the user by storing and analyzing the communication demand of the user; Step S103 of grouping the users by using the clustering algorithm and calculating the central nodes for maximizing the communication throughput of the respective clusters, Step S104 of determining whether communication overload occurs, Step S105 of arranging the unmanned aerial vehicles at the central nodes of the respective clusters, when the overload does not occur, depending on whether the communication overload occurs, Step S106 of re-arranging the unmanned aerial vehicles by using the avoidance algorithm when the communication overload occurs. Additionally, Step S107 of learning the UAV arrangement by using the Q-learning algorithm for maximizing the communication throughput can be further included. The description with a specific example of the clustering-UAV arrangement method for maximizing the communication throughput is the same as the description of the clustering-UAV arrangement device that maximizes the communication throughput described above in FIGS. 2 to 4, and thus the description of the specific example is omitted.

Figure 6:
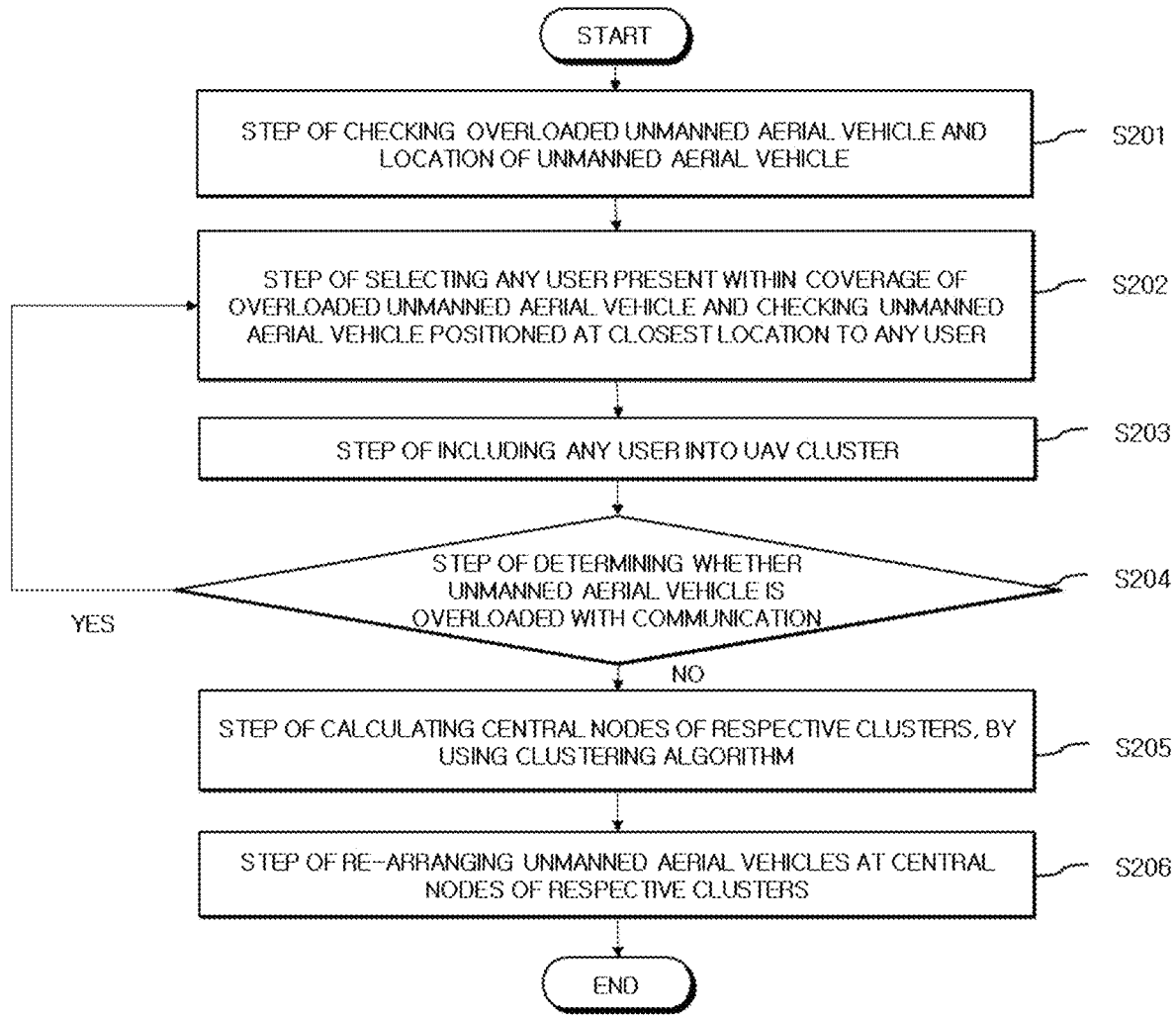
FIG. 6 is a flowchart for illustrating an avoidance algorithm according to the other example of the invention.

FIG. 6 is a flowchart for illustrating the avoidance algorithm according to the other example of the invention.

With reference to FIG. 6, the avoidance algorithm can include Step S201 of checking the overloaded unmanned aerial vehicle and checking location information of the unmanned aerial vehicle, Step S202 of selecting any user who belongs to the overloaded unmanned aerial vehicle and checking an unmanned aerial vehicle present at the closest location to the user in distance, Step S203 of including the user in a cluster of the unmanned aerial vehicle, Step S205 of determining whether the overloaded unmanned aerial vehicle is overloaded. In addition, when the unmanned aerial vehicle is still in the overloaded state, Steps S201 and S203 are repeatedly executed. When the unmanned aerial vehicle is not overloaded, Step S206 of calculating the central nodes of the respective clusters by using the clustering algorithm is executed. Step S207 of re-arranging the unmanned aerial vehicles at the central nodes of the respective clusters can be included. The description of a specific example of the avoidance algorithm of the invention is the same as the description of the clustering-UAV arrangement device described above in FIGS. 2 to 4, and thus the description of the specific example is omitted. Hereinafter, with reference to FIGS. 7 and 8, experimental results of performance of the UAV arrangement device of the invention are described.

Figure 7:
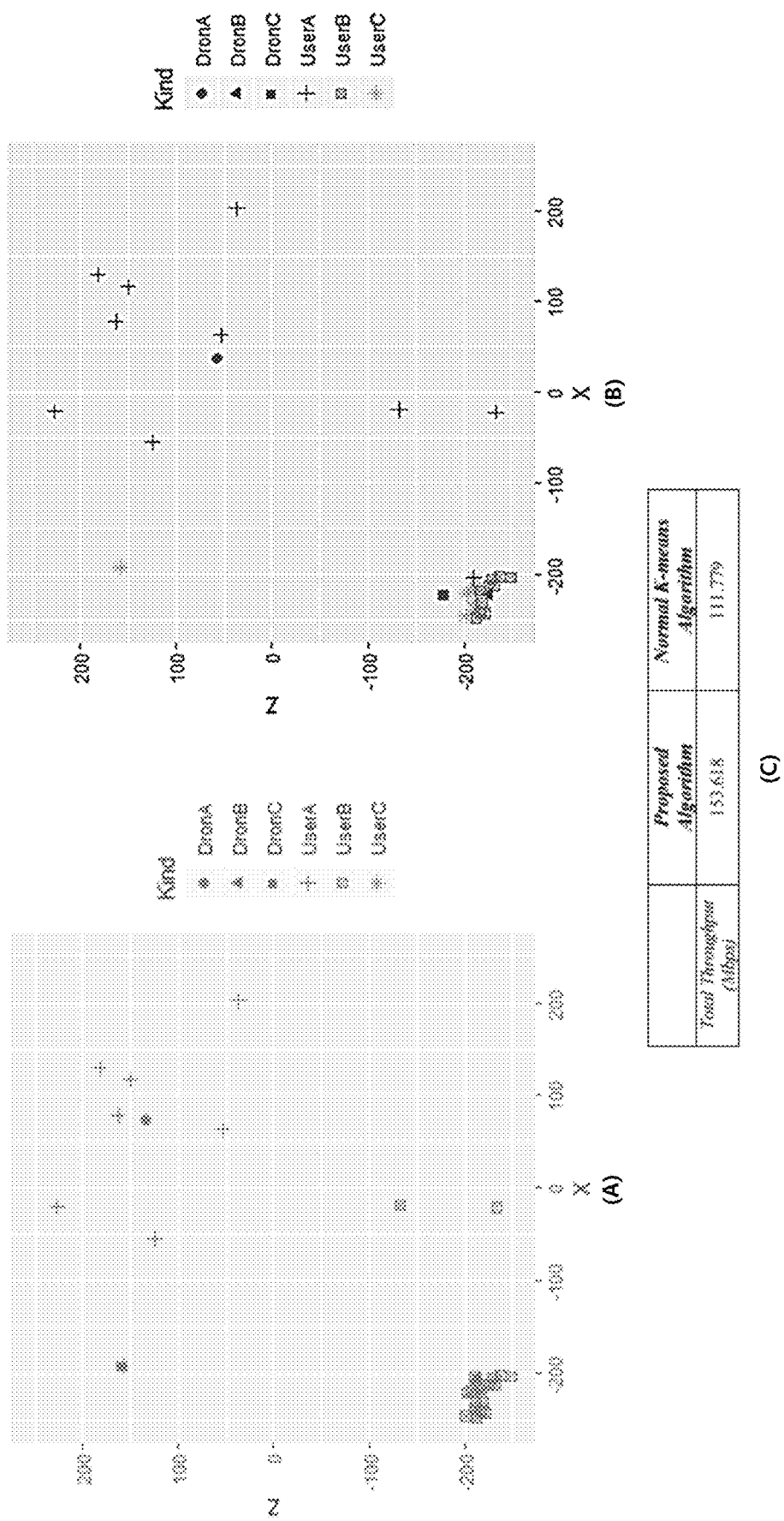
FIG. 7 is a graph illustrating experimental results of performance of the clustering-UAV arrangement device that maximizes communication throughput according to the example of the invention.

FIG. 7 is a graph illustrating experimental results of the performance of the clustering-UAV arrangement device that maximizes communication throughput according to the example of the invention.

An experiment to check the performance of the arrangement device of the invention is designed as follows. In the experiment, an environment, in which 30 users having different communication demands and three unmanned aerial vehicles are arranged, is set, and initial locations of the three unmanned aerial vehicles are arranged at any locations of a region having a size of 250 m×250 m.

The optimal location of the altitudes of the unmanned aerial vehicles for each communication are set to 200 m. In the experiment, while the clustering algorithm used in the clustering algorithm modeling unit is changed to maximizing the communication throughput of the 30 users having different communication demands, results of the change are checked.

Therefore, FIG. 7A illustrates a result of arrangement of the unmanned aerial vehicles by using a general K-means algorithm to which the communication demand of the users is not reflected in the clustering algorithm modeling unit. In FIG. 7A, a user B and a user C stay together in any region, and thus a situation of generating very high communication demand in the corresponding region can be checked to occur. When the general K-means algorithm, to which the communication demand of the users is not reflected, is used, it is possible to check that only one unmanned aerial vehicle Drone B is disposed in the region in which the communication demand is very high.

On the other hand, FIG. 7B illustrates a result of arrangement of the unmanned aerial vehicles by using the modified K-means algorithm to which the different communication demands of the users are reflected. In a case of FIG. 7B, it is possible to check that two unmanned aerial vehicles Drone B and C are disposed in the region in which the communication demand of the users is high. Further, with reference to FIG. 7C, it is possible to check the communication throughput of Drone B. When the communication demands of the users are not reflected, the communication throughput of Drone B corresponds to about 111 Mbps. However, when the communication demands of the users of the invention are reflected, it is possible to check that the communication throughput of Drone B reaches about 153 Mbps. This is an experimental result showing that, when the communication demand of the users rapidly increases in any region, distribution of the communication throughput and processing of distributed communication throughput by arranging a plurality of unmanned aerial vehicles is more effective regarding the communication throughput.

Figure 8:
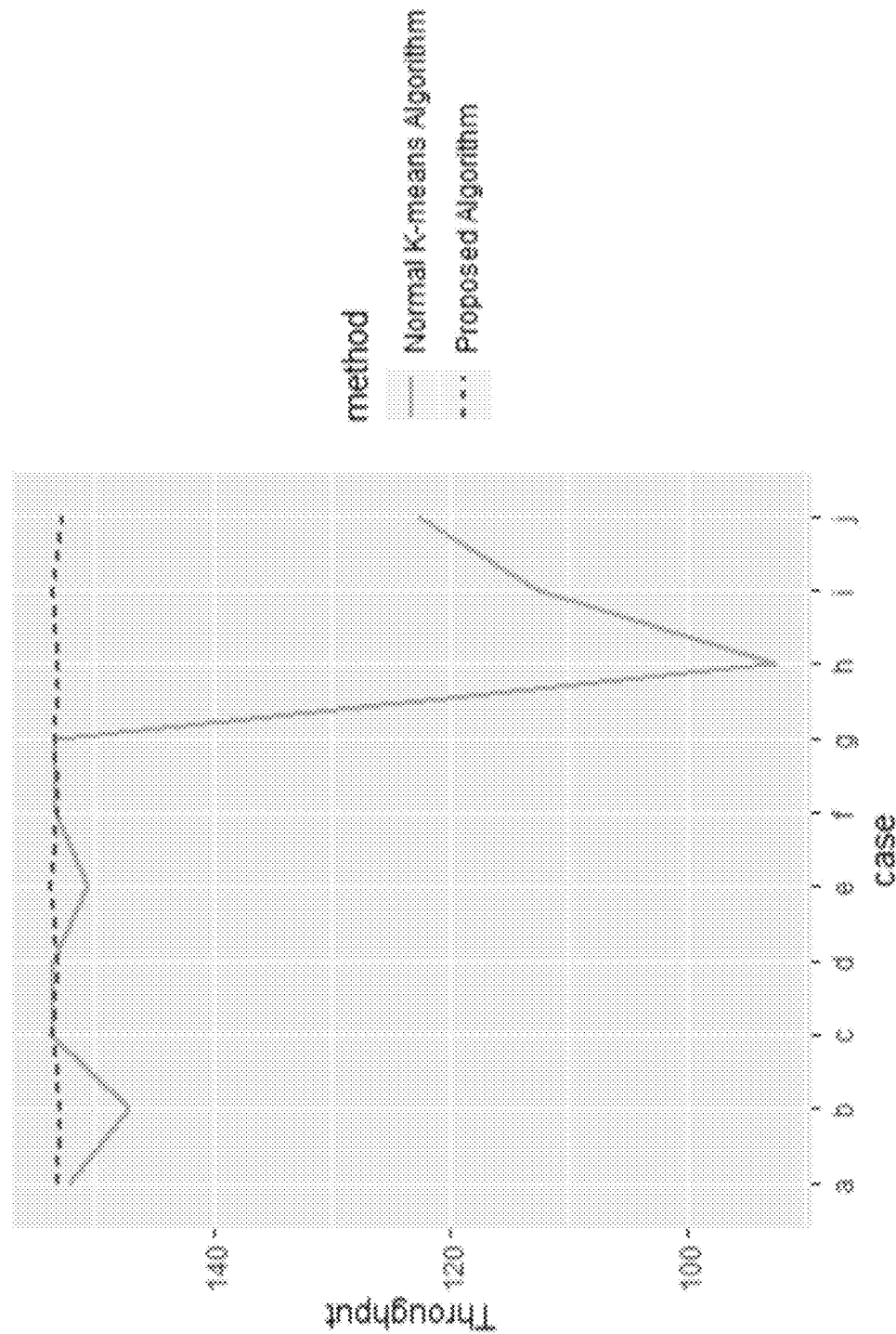
FIG. 8 is a graph illustrating experimental results for checking performance of the clustering-UAV arrangement device that maximizes communication throughput according to the example of the invention.

FIG. 8 is a graph illustrating experimental results for checking performance of the clustering-UAV arrangement device that maximizes communication throughput according to the example of the invention.

With reference to FIG. 8, cases where users having different communication demands are arranged to any locations are set as Cases A to J. Hence, the communication throughputs obtained in cases of using the modified K-means algorithm and the general K-means algorithm are compared to each other. Cases C, D, F, and G correspond to a case where the users are relatively uniformly distributed, compared to other Cases. In this case, the two algorithms both record similar communication throughput. On the other hand, it is possible to check that Cases A, B, E, H, I, and J has higher communication throughput than a case where a result obtained by using the modified K-means algorithm is different. Further, in a case of using the modified K-means algorithm of the invention, the communication throughput of Cases A to J is checked to be relatively uniform without any considerable change. It is possible to check that the UAV arrangement device of the invention can flexibly cope with changes of various communication environments.

The examples of the invention disclosed in this specification and the drawings are provided only as specific examples for simple description of technical content of the invention and for easy understanding of the invention, and the examples of the invention are not provided to limit the scope of the invention. It is obvious to a person of ordinary knowledge in the technical field to which the invention belongs that it is possible to implement other modification examples based on the technical ideas of the invention, in addition to the examples disclosed here.

While the present invention has been described with respect to the specific embodiments, it will be apparent to those skilled in the art that various changes and modifications may be made without departing from the spirit and scope of the invention as defined in the following claims.

What is claimed is:

1. A UAV arrangement device that maximizes communication throughput, the UAV arrangement device comprising:
   a communication module unit that receives location information and communication demand information of a user and transmits UAV arrangement information;
   a user information unit that stores and analyzes the location information and the communication demand information of the user;
   a UAV information unit that stores basic UAV information including UAV communication throughput; and
   a clustering algorithm modeling unit that calculates a location at which communication throughput is maximized, with a clustering algorithm based on the location information and the communication demand information of the user, wherein the clustering algorithm modeling unit calculates a location at which the communication throughput is maximized, by applying a weight value depending on an amount of communication demand of the user.

2. The UAV arrangement device that maximizing communication throughput according to claim 1, further comprising:
   an overload predicting algorithm modeling unit that re-arranges unmanned aerial vehicles excluding any communication-overloaded unmanned aerial vehicle, with an avoidance algorithm, when any unmanned aerial vehicle is overloaded with communication.

3. The UAV arrangement device that maximizing communication throughput according to claim 2, further comprising:
   an arrangement learning modeling unit that learns a UAV arrangement location at which communication throughput is maximized, by using a Q-learning algorithm.

4. A UAV arrangement method for maximizing communication throughput, the UAV arrangement method comprising:
   checking location information of a user;
   checking communication demand of a user;
   calculating central nodes of respective clusters at which communication throughput is maximized, by using a clustering algorithm, wherein, in calculating the central nodes, a location, at which communication throughput is maximized, is calculated by applying a weight value depending on an amount of communication demand of the user;
   arranging unmanned aerial vehicles of the central nodes of the respective cluster.

5. The UAV arrangement method for maximizing communication throughput, according to claim 4, further comprising:
   re-arranging unmanned aerial vehicles excluding any communication-overloaded unmanned aerial vehicle, with an avoidance algorithm, when any unmanned aerial vehicle is overloaded with communication.

6. The UAV arrangement method for maximizing communication throughput, according to claim 5, further comprising:
   learning a UAV arrangement location at which communication throughput is maximized, by using a Q-learning algorithm.

7. A UAV arrangement method for maximizing communication throughput, the UAV arrangement method comprising:
   checking location information of a user;
   checking communication demand of a user;
   calculating central nodes of respective clusters at which communication throughput is maximized, by using a clustering algorithm;
   arranging unmanned aerial vehicles of the central nodes of the respective cluster; and
   re-arranging unmanned aerial vehicles excluding any communication-overloaded unmanned aerial vehicle, with an avoidance algorithm, when any unmanned aerial vehicle is overloaded with communication.

8. The UAV arrangement method for maximizing communication throughput, according to claim 7, further comprising:
   in the calculating of the central nodes, a location, at which communication throughput is maximized, is calculated by applying a weight value depending on an amount of communication demand of the user.

9. The UAV arrangement method for maximizing communication throughput, according to claim 7, further comprising:
   learning a UAV arrangement location at which communication throughput is maximized, by using a Q-learning algorithm.

10. A UAV arrangement device that maximizes communication throughput, the UAV arrangement device comprising:
    a communication module unit that receives location information and communication demand information of a user and transmits UAV arrangement information;
    a user information unit that stores and analyzes the location information and the communication demand information of the user;

a UAV information unit that stores basic UAV information including UAV communication throughput;

a clustering algorithm modeling unit that calculates a location at which communication throughput is maximized, with a clustering algorithm based on the location information and the communication demand information of the user; and an overload predicting algorithm modeling unit that re-arranges unmanned aerial vehicles excluding any communication-overloaded unmanned aerial vehicle, with an avoidance algorithm, when any unmanned aerial vehicle is overloaded with communication.

11. The UAV arrangement device that maximizing communication throughput according to claim 10, wherein the clustering algorithm modeling unit calculates a location at which communication throughput is maximized, by applying a weight value depending on an amount of communication demand of the user.

12. The UAV arrangement device that maximizing communication throughput according to claim 10, further comprising:

an arrangement learning modeling unit that learns a UAV arrangement location at which communication throughput is maximized, by using a Q-learning algorithm.

* * * * *